(12) United States Patent
Tock

(10) Patent No.: US 7,305,475 B2
(45) Date of Patent: Dec. 4, 2007

(54) SYSTEM AND METHOD FOR ENABLING A CLIENT APPLICATION TO OPERATE OFFLINE FROM A SERVER

(75) Inventor: Theron Tock, Mountain View, CA (US)

(73) Assignee: WebMD Health, New York, NY (US)

( * ) Notice: Subject to any disclaimer, the term of this patent is extended or adjusted under 35 U.S.C. 154(b) by 327 days.

(21) Appl. No.: 10/666,818

(22) Filed: Sep. 17, 2003

(65) Prior Publication Data

US 2004/0064570 A1 Apr. 1, 2004

(51) Int. Cl.
*G06F 15/16* (2006.01)

(52) U.S. Cl. ............ 709/227; 709/203; 709/219; 709/225; 709/232; 718/102

(58) Field of Classification Search ............ 709/203, 709/219, 227, 232, 225, 235; 718/102
See application file for complete search history.

(56) References Cited

U.S. PATENT DOCUMENTS

| | | | |
|---|---|---|---|
| 4,315,309 A | 2/1982 | Coli | 705/3 |
| 4,812,994 A | 3/1989 | Taylor et al. | 705/410 |
| 4,858,121 A | 8/1989 | Barber et al. | 705/2 |
| 4,868,376 A | 9/1989 | Lessin et al. | 235/492 |
| 4,882,474 A | 11/1989 | Anderl et al. | 235/380 |
| 4,916,611 A | 4/1990 | Doyle, Jr. et al. | 705/2 |
| 4,949,251 A | 8/1990 | Griffen et al. | 714/20 |
| 4,960,982 A | 10/1990 | Takahira | 235/382 |
| 4,984,272 A | 1/1991 | McIlroy et al. | 713/202 |
| 5,150,409 A | 9/1992 | Elsner | 713/177 |
| 5,241,671 A | 8/1993 | Reed et al. | 707/104.1 |
| 5,251,152 A | 10/1993 | Notess | 709/224 |
| 5,301,105 A | 4/1994 | Cummings, Jr. | 705/2 |
| 5,301,246 A | 4/1994 | Archibald et al. | 379/142.06 |
| 5,325,294 A | 6/1994 | Keene | 705/3 |
| 5,327,341 A | 7/1994 | Whalen et al. | 705/3 |
| 5,430,875 A | 7/1995 | Ma | 719/318 |
| 5,452,459 A * | 9/1995 | Drury et al. | 707/3 |

(Continued)

OTHER PUBLICATIONS

Draper, "Using Netscape Cookies with Powersoft's Web," printed Aug. 2000 from www.consultees.com website, pp. 1-5.

(Continued)

*Primary Examiner*—Michael Won
(74) *Attorney, Agent, or Firm*—Wilmer Cutler Pickering Hale & Dorr LLP

(57) ABSTRACT

One disadvantage of the client/server computing model is the client's strong dependence on the server. A system and method are disclosed for enabling a client application to operate offline from the server. For each request, the client application registers a request entry with a scheduler, informing the scheduler of an associated application callback. The scheduler then invokes this application callback when a network connection is available for use, and the client application then sends the request to the server. Error recovery methods are described for requests that are sent to the server but for which no reply is received, and for other error scenarios. Some applications may maintain client-side caches to lookup information independently of the server. Synchronization entries may be registered with the scheduler for keeping the client-side cache in sync with the server-side master data.

55 Claims, 11 Drawing Sheets

U.S. PATENT DOCUMENTS

| | | | |
|---|---|---|---|
| 5,465,082 A | 11/1995 | Chaco | 340/825.49 |
| 5,491,800 A | 2/1996 | Goldsmith et al. | 709/221 |
| 5,550,971 A | 8/1996 | Brunner et al. | 395/161 |
| 5,553,241 A * | 9/1996 | Shirakihara | 709/227 |
| 5,559,885 A | 9/1996 | Drexler et al. | 235/380 |
| 5,559,888 A | 9/1996 | Jain et al. | 380/25 |
| 5,560,008 A | 9/1996 | Johnson et al. | 713/201 |
| 5,572,422 A | 11/1996 | Nematbakhsh et al. | 705/3 |
| 5,583,563 A * | 12/1996 | Wanderscheid et al. | 725/132 |
| 5,588,148 A | 12/1996 | Landis et al. | 707/1 |
| 5,629,981 A | 5/1997 | Nerlikar | 713/168 |
| 5,664,109 A | 9/1997 | Johnson et al. | 705/2 |
| 5,664,207 A | 9/1997 | Crumpler et al. | 715/505 |
| 5,772,585 A | 6/1998 | Lavin et al. | 600/300 |
| 5,790,785 A | 8/1998 | Klug et al. | 713/202 |
| 5,809,476 A | 9/1998 | Ryan | 705/2 |
| 5,815,665 A | 9/1998 | Teper et al. | 709/229 |
| 5,827,180 A | 10/1998 | Goodman | 600/300 |
| 5,832,488 A | 11/1998 | Eberhardt | 707/10 |
| 5,841,970 A | 11/1998 | Tabuki | 713/201 |
| 5,845,255 A | 12/1998 | Mayaud | 705/3 |
| 5,848,397 A | 12/1998 | Marsh et al. | 705/14 |
| 5,857,190 A | 1/1999 | Brown | 707/10 |
| 5,862,327 A | 1/1999 | Kwang et al. | 709/203 |
| 5,867,821 A | 2/1999 | Ballantyne et al. | 705/2 |
| 5,889,779 A * | 3/1999 | Lincoln | 370/398 |
| 5,903,889 A | 5/1999 | De la Huerga et al. | 707/3 |
| 5,905,884 A | 5/1999 | Williams | 709/227 |
| 5,915,240 A * | 6/1999 | Karpf | 705/2 |
| 5,953,704 A | 9/1999 | McIlroy et al. | 705/2 |
| 5,960,403 A | 9/1999 | Brown | 705/2 |
| 5,966,715 A | 10/1999 | Sweeney et al. | 707/203 |
| 5,967,789 A | 10/1999 | Segel et al. | 434/236 |
| 5,974,412 A | 10/1999 | Hazlehurst et al. | 707/3 |
| 5,978,842 A | 11/1999 | Noble et al. | 709/218 |
| 5,999,526 A * | 12/1999 | Garland et al. | 370/352 |
| 6,006,269 A | 12/1999 | Phaal | 709/227 |
| 6,018,619 A | 1/2000 | Allard et al. | 709/224 |
| 6,021,507 A * | 2/2000 | Chen | 714/2 |
| 6,031,818 A | 2/2000 | Lo et al. | 370/216 |
| 6,035,030 A * | 3/2000 | Gore | 379/209.01 |
| 6,058,394 A * | 5/2000 | Bakow et al. | 707/10 |
| 6,070,160 A | 5/2000 | Geary | 707/4 |
| 6,070,184 A * | 5/2000 | Blount et al. | 709/200 |
| 6,070,197 A * | 5/2000 | Cobb et al. | 719/315 |
| 6,073,106 A | 6/2000 | Rozen et al. | 705/3 |
| 6,073,163 A * | 6/2000 | Clark et al. | 709/203 |
| 6,092,196 A | 7/2000 | Reiche | 713/200 |
| 6,112,183 A | 8/2000 | Swanson et al. | 705/2 |
| 6,141,759 A | 10/2000 | Braddy | 713/201 |
| 6,161,123 A * | 12/2000 | Renouard et al. | 709/203 |
| 6,167,523 A | 12/2000 | Strong | 713/201 |
| 6,178,416 B1 | 1/2001 | Thompson et al. | 707/3 |
| 6,189,001 B1 * | 2/2001 | McGovern et al. | 707/1 |
| 6,189,036 B1 | 2/2001 | Kao | 709/229 |
| 6,253,228 B1 | 6/2001 | Ferris et al. | 709/203 |
| 6,263,330 B1 | 7/2001 | Bessette | 707/4 |
| 6,308,221 B1 * | 10/2001 | Perlman et al. | 709/241 |
| 6,334,778 B1 | 1/2002 | Brown | 273/429 |
| 6,343,313 B1 * | 1/2002 | Salesky et al. | 709/204 |
| 6,347,374 B1 | 2/2002 | Drake et al. | 713/200 |
| 6,362,836 B1 | 3/2002 | Shaw et al. | 345/744 |
| 6,385,611 B1 | 5/2002 | Cardona | 707/6 |
| 6,401,072 B1 | 6/2002 | Haudenschild et al. | 705/3 |
| 6,421,701 B1 * | 7/2002 | Elnozahy | 718/100 |
| 6,434,532 B2 * | 8/2002 | Goldband et al. | 705/7 |
| 6,438,110 B1 * | 8/2002 | Rai et al. | 370/254 |
| 6,449,598 B1 | 9/2002 | Green et al. | 705/2 |
| 6,484,206 B2 * | 11/2002 | Crump et al. | 709/227 |
| 6,490,245 B2 * | 12/2002 | Burns et al. | 370/216 |
| 6,494,831 B1 * | 12/2002 | Koritzinsky | 600/301 |
| 6,549,934 B1 * | 4/2003 | Peterson et al. | 709/203 |
| 6,574,239 B1 | 6/2003 | Dowling et al. | 370/469 |
| 6,665,719 B1 * | 12/2003 | Isoda | 709/227 |
| 6,801,914 B2 * | 10/2004 | Barga et al. | 707/10 |
| 6,826,696 B1 | 11/2004 | Chawla et al. | 713/201 |
| 6,879,674 B2 * | 4/2005 | Strandberg | 379/210.01 |
| 6,934,735 B1 * | 8/2005 | Emens et al. | 709/203 |
| 6,973,478 B1 * | 12/2005 | Ketonen et al. | 709/203 |
| 6,993,763 B2 * | 1/2006 | Hayes, Jr. | 718/102 |
| 7,093,017 B1 * | 8/2006 | Olgaard et al. | 709/227 |
| 7,143,172 B2 * | 11/2006 | Isoda | 709/227 |
| 2006/0271681 A1 * | 11/2006 | Apreutesei et al. | 709/226 |

OTHER PUBLICATIONS

Dorner et al, "Remote Mail Checking Protocol," Jun. 1992, pp. 1-4.
"Read Mail with Netscape Navigator," printed Aug. 2000 from http://home.netscape.com website, 1 pg.

* cited by examiner

SYSTEM AND METHOD FOR ENABLING A CLIENT APPLICATION TO OPERATE OFFLINE FROM A SERVER

PRIORITY CLAIM

This application claims benefit of priority of U.S. provisional application Ser. No. 60/158,937 titled "System and Method for Enabling a Client Application to Operate Offline" filed Oct. 12, 1999, whose inventor was Theron Tock.

FIELD OF THE INVENTION

The present invention relates to the field of client/server computing, and more particularly to a system and method for managing client requests using a scheduler.

DESCRIPTION OF THE RELATED ART

Many application programs are constructed according to some form of the client/server computing model, in which applications are split into a client side and a server side. There are many variations of client/server applications. In general, a client/server application is an application in which a process running on the client side sends requests to a process running on the server side. The server process handles the requests and usually returns a result to the client process. The client requests can be of any type. For example, the client may request the use of some server resource, such as a file or disk space. The client may also request application-specific services from the server. For example, part or all of the business logic for an application may execute on the server side.

In the most typical case, the client process and the server process execute on separate computers and communicate with each other via a network. Multiple clients may connect to a server and request its services. FIG. 1 illustrates an exemplary client/server computing system in which client processes running in client computers 100 communicate with a server process(es) running in a server 104 via network connections 102. With the advent of the Internet and its related technologies, client machines may be located anywhere relative to the server machine. A familiar example of this is the use of a web browser running on a client machine to request files from web servers throughout the world.

Client/server computing offers several advantages over other types of computing models, such as mainframe computing or standalone applications. One advantage over standalone applications is that the difficulty of performing software maintenance and upgrades may be greatly reduced by centralizing some or all of the application logic to the server side. Thus, as in mainframe computing, software may be located in a single location and maintained by experienced professionals. However, unlike the dumb terminals used in mainframe computing, processing power available on the client side may still be leveraged to perform some of the processing required. For example, the client side is typically responsible for independently handling the user interface for the application. This distribution of processing takes advantage of the processing power of client machines and reduces the load on server machines.

However, the client/server computing model has drawbacks of its own. One of these drawbacks is the client's dependence on the server. Since the client depends on the server to handle requests, communication problems with the server are usually apparent to the application user. The client's ability to communicate with the server depends, of course, on the client having a valid network connection. However, there are several reasons why a network connection may not be constantly available to a client application. For example, the network between the client and the server, or the server itself, may be temporarily out of operation. Also, the application user or the application itself may choose to intentionally disconnect from the network, e.g., in order to save on service provider charges, or, in some situations, in order to maximize the network bandwidth available for other client-side applications to use. Also, the client application may run on a portable machine, such as a notebook computer, with an intermittent network connection. Besides the potential problem of the client needing a network connection to operate, there are several other problems associated with the client's strong dependence on the server. For example, communication with the server may be impossible, e.g., due to a server crash, or communication may be very slow, e.g., due to a slow network. Also, the server may experience problems due to having to support a large number of simultaneous client connections.

SUMMARY OF THE INVENTION

The problems outlined above may in large part be solved by enabling a client application program to operate offline from a server by interfacing with a scheduler. For each request, the client application may register a request entry with the scheduler. The scheduler may then notify the client application when a network connection is available for use, and the client application may then send the request to the server. For example, the user may create a document and issue a command to file the document while the client side is disconnected from the network. The client application may register a "file document" request with the scheduler, and then actually perform the request at some later time when the client side is reconnected to the network. Thus, the client application is able to operate offline from the server.

When a client application registers a request entry with the scheduler, the application may inform the scheduler of an application callback to associate with the entry, i.e., a software callback for the scheduler to invoke at an opportune time, such as when a network connection is established. When the application callback is invoked, the application callback can use the network connection to actually send the request to and receive the results from the server. Error recovery methods are included for requests that are sent to the server but for which no reply is received, and for other error scenarios. For some applications, certain requests may require the server to return information. For example, a healthcare service provider application may request a patient's health insurance profile from the server, in order to display the profile. To better handle these types of requests, the client-side of the application may maintain a cache that can be checked for the desired information before scheduling a request entry to perform a server request. As described in detail below, the client application may register synchronization entries with the scheduler in order to keep the client-side cache in sync with the server-side master data. The scheduler can invoke a synchronization callback for each synchronization entry at a designated time. After performing the appropriate synchronization operation, the synchronization callback may then inform the scheduler of the next time or time interval to invoke the synchronization callback.

The system and method described herein may be applied to many types of client/server applications. One important class of applications that may benefit from the ability to operate offline from a server is web applications. Web-browsing and web display capabilities are becoming increasingly important and common in applications, not only because of the networking and communications features they provide, but also because they enable users to interact with a variety of applications using a familiar type of user interface. However, traditional web applications suffer from the strong server dependency described above. One embodiment of a web application enabled to utilize a scheduler to operate offline from a server is described below.

BRIEF DESCRIPTION OF THE DRAWINGS

A better understanding of the present invention can be obtained when the following detailed description of the preferred embodiment is considered in conjunction with the following drawings, in which.

Figure 1:
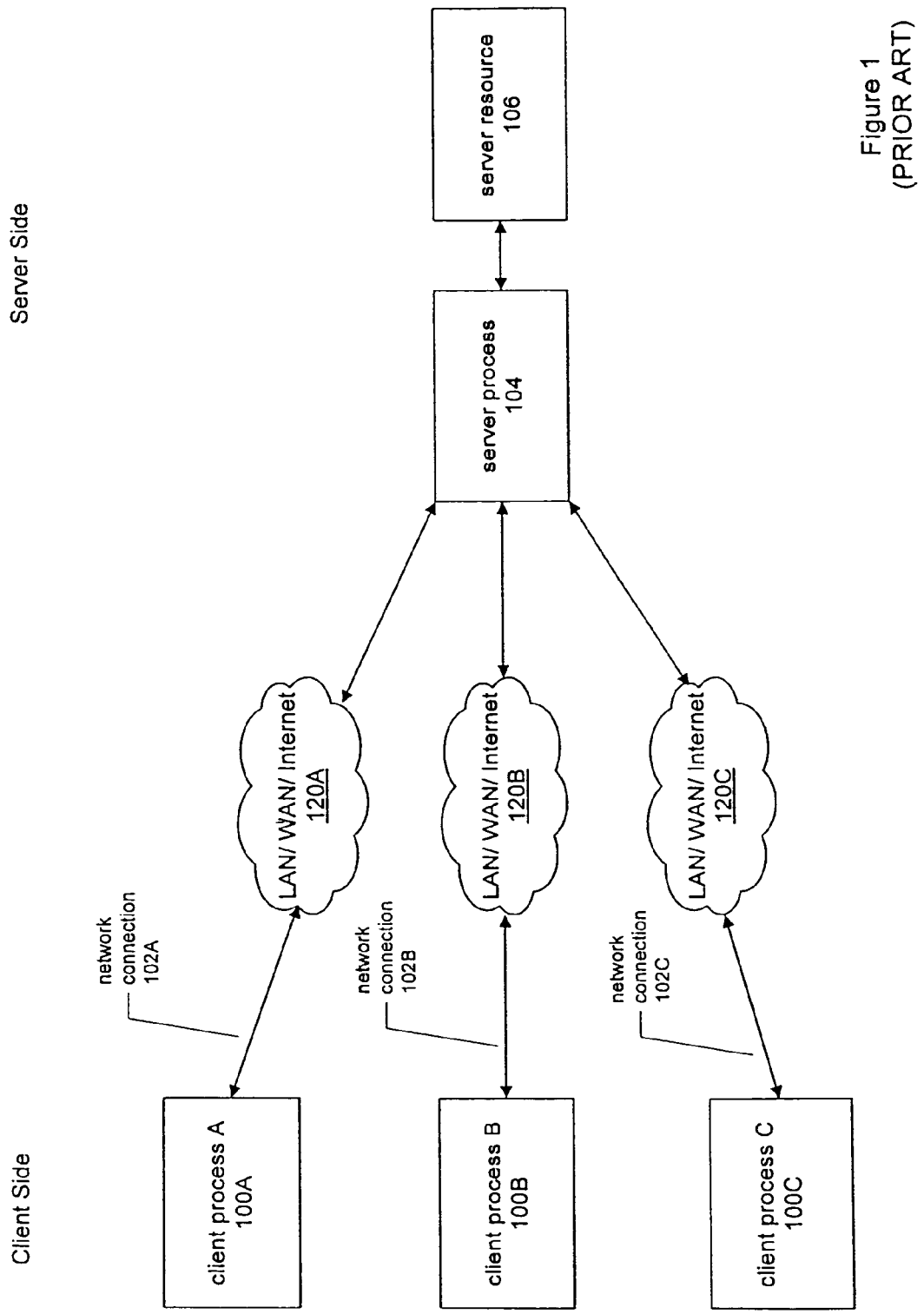
FIG. 1 illustrates an exemplary client/server computing system.

While the invention is susceptible to various modifications and alternative forms, specific embodiments are shown by way of example in the drawings and are herein described in detail. It should be understood however, that drawings and detailed description thereto are not intended to limit the invention to the particular form disclosed. But on the contrary the invention is to cover all modifications, equivalents, and alternatives falling within the spirit and scope of the present invention as defined by the appended claims.

DETAILED DESCRIPTION OF THE PREFERRED EMBODIMENTS

Incorporation by Reference

The following references are hereby incorporated by reference.

For information on constructing applications that utilize the Microsoft Internet Explorer code base, please refer to:

Isaacs, *Inside Dynamic HTML*, Microsoft Press, 1997; or to

Roberts, *Programming Microsoft Internet Explorer 5*, Microsoft Press, 1999.

Figure 2A:
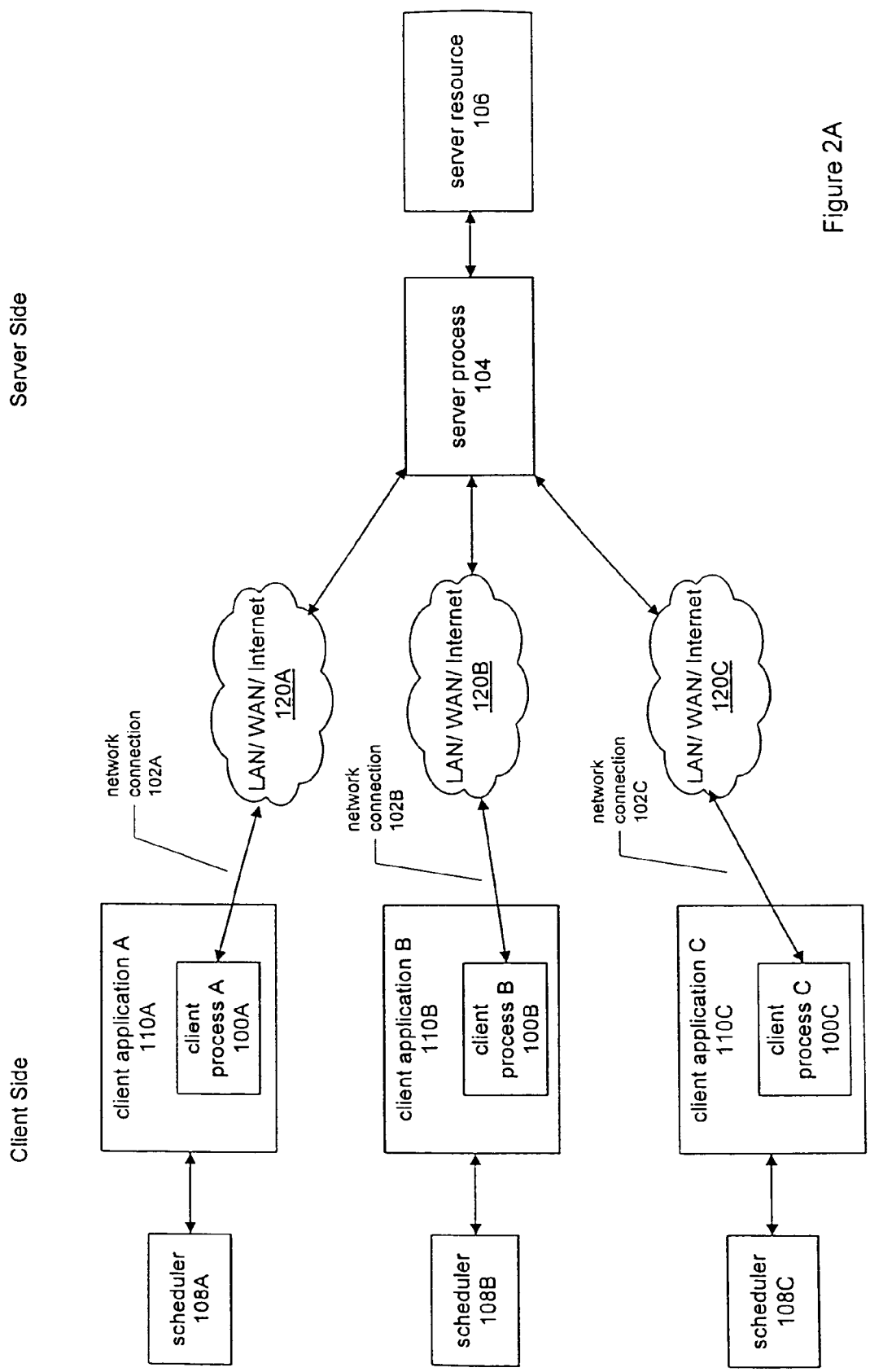
FIG. 2A illustrates an exemplary client/server computing system employing a scheduler.
Figure 2B:
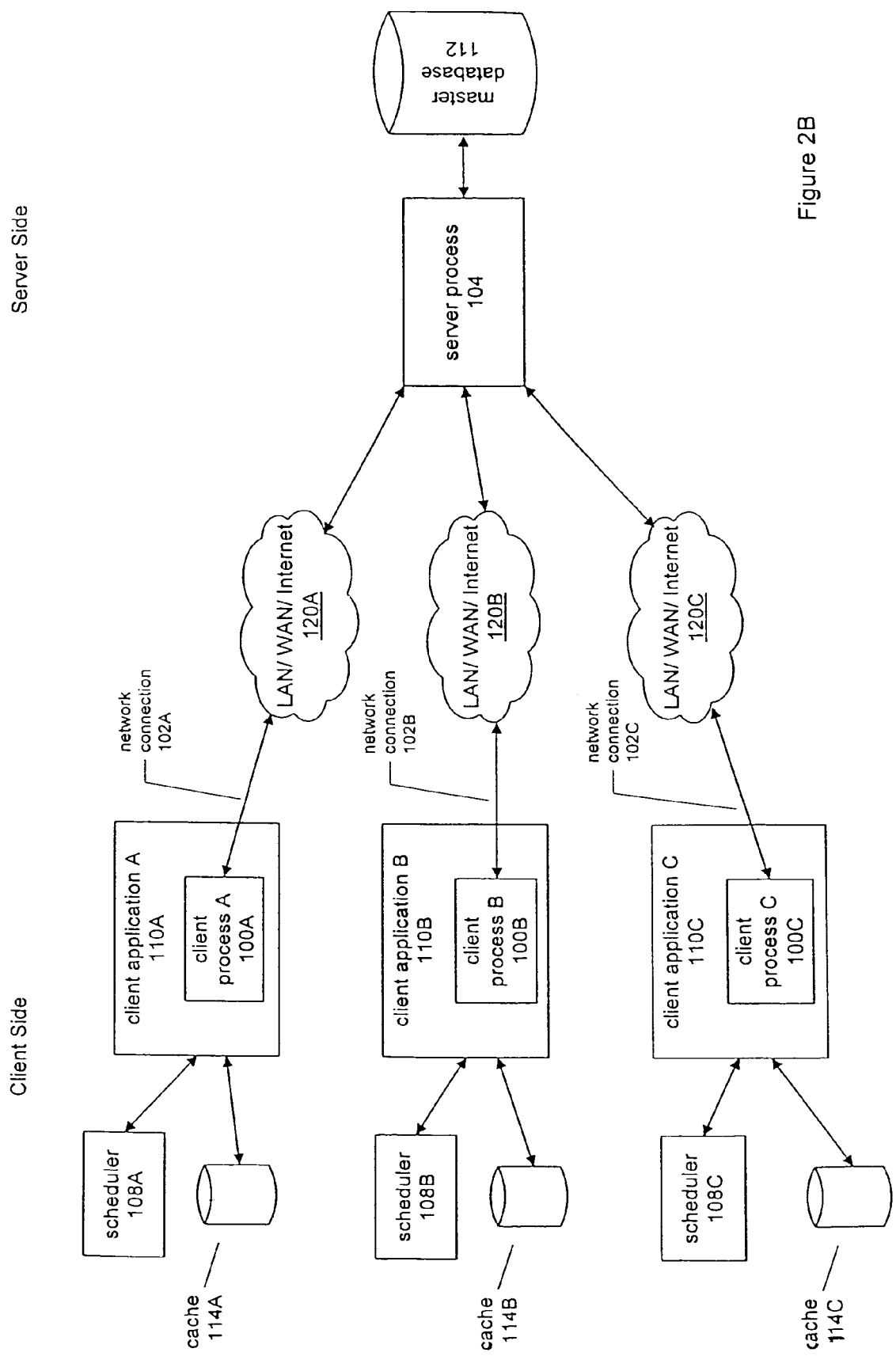
FIG. 2B illustrates an exemplary client/server computing system employing a scheduler and a client-side cache.

FIGS. 2A and 2B—Client/Server Systems Employing a Scheduler

FIG. 2A illustrates a client/server computing system according to one embodiment of the present invention. FIG. 2A is similar to the system shown in FIG. 1. However, FIG. 2A is illustrated at a finer level of detail, in terms of computer processes running in the client and server computers, and shows additional elements enabling offline operation of client applications, as described below.

As shown in FIG. 2A, each client process 100 communicates with a server process 104 via a network connection 102 and 120. The client processes 100 and the server process 104 may be associated with any type of application program or computing service. For example, a client process may communicate with a server process to perform a high-level operation such as an electronic commerce transaction, or the client and server processes may work together to perform a lower-level operation, such as printing a document. The server process 104 typically interacts with some type of server-side resource 106 on behalf of a client process. For example, a client process may request the use of some resource from the server process, such as a file or disk storage space, a client process may request a server-side database to lookup or store information, a client process may request the server process to invoke a server-side program and return the results, etc.

Each of the client processes 100 may run in any type of client-side environment. For example, a client process may run in a desktop computer or workstation running any of various operating systems, such as Windows, Mac OS, Unix, etc., or a client process may run in a portable computing device, such as a personal data assistant, smart cellular phone, etc. The server process 104 may also run in any type of computer. Any number of clients may communicate with the server, depending on the type of application running on the system and the resources available to the server, such as network connection speed, processing power, etc.

It is noted that the client process 100 may run on computers which act as servers to other clients. In other words, client/server systems may be viewed at many different levels of detail, and both the client side and the server side of a client/server system maybe implemented using client/server subsystems. For example, a Web application may be viewed at a high level, where a client-side Web browser process running on a user's machine communicates with and receives data from a server-side Web server process. However, at finer levels of detail, the Web server may be viewed as a client to an application server that performs the application business logic processing, and the application server may in turn be viewed as a client to a database server, etc.

Each of the clients may connect to the server through any of various types of networks 120, e.g., via a LAN, WAN, Intranet, Internet, etc., or any combination of these. Each client may use a network connection 102 as a communication channel to send requests and receive responses over the network 120. Any of various types of network protocols may be used to send messages across the network. As messages are sent between the clients and the server, they may pass through various gateways, network routers, etc. Each network connection 102 may be a connection of any type, such as a PPP or SLIP dialup link, an Ethernet or token ring connection, an ISDN connection, a DSL connection, a cable modem connection, any of various types of wireless connections, etc.

In the embodiment of FIG. 2A, each client process 100 is shown as a process associated with a client application 110 which interfaces with a scheduler 108. The scheduler 108 manages requests to the server and enables the client application to operate in an offline mode. As discussed in detail below, when a client application needs to make a server request, the client application may utilize an application programming interface (API) provided by the scheduler to register a request entry for the request. In the preferred embodiment, the client application first stores the request context information, such as the type of request to be made and the parameters or other data to send with the request. When the client application then registers the request entry with the scheduler, the client application may provide a key for the scheduler to associate with the request entry. The client application can later use this key to retrieve the stored context information for the request. For example, the client application may store the request context information in a database table, and the key given to the scheduler may be the primary key value identifying a database table row associated with the request.

When the client application registers a request entry with the scheduler, it may also inform the scheduler of an application callback to associate with the request entry. As described in detail below, when the scheduler determines that a network connection is available for use by the client application, the scheduler may then invoke the application callback, passing it the key associated with the request entry. The application callback may then lookup the context information using the key and use the context information to form and send the appropriate request to the server. It is noted that the scheduler itself does not need to posses any knowledge about the types of requests to be made, or how to properly perform the requests, or how to store the request context information. By maintaining request entries with associated context information key values and application callbacks, the scheduler may provide a general mechanism to manage any type of request for any type of application. As discussed above, client/server systems may be considered at various levels of detail, and the use of a scheduler to manage requests may be applicable at any of these levels.

The scheduler and its API may be implemented in various ways, as appropriate for a particular application. For example, the scheduler may be tightly associated with the application code. The scheduler may also be an independent software component, such as an ActiveX/COM component or a CORBA component, available for any client application program to use. The scheduler may reside on the same computer as the client application, or the scheduler may reside elsewhere, such as on a computer connected to the client application computer through a LAN or other type of network.

Many client/server systems involve client requests to the server to retrieve information from or store information to a database. FIG. 2B illustrates one embodiment of an architecture enabling client applications of this type to operate offline from the server. In FIG. 2B, a master database 112 is maintained on the server side, and each client application maintains a client-side cache 114. Thus, if a client application needs to perform an operation utilizing information from the master database 112, the client application may first check to see whether the client-side cache 114 already contains the desired information. If so, the client application may use the cached information. Otherwise, the client application may register a request entry with the scheduler to lookup the information, specifying an application callback to perform the lookup request. The scheduler may then invoke the application callback when the client computer is connected to the network. If the client computer already has a valid network connection, the scheduler may immediately invoke the application callback.

The client-side cache 114 may be implemented in any of various ways. For example, the client application may interface with a separate client-side database to cache information, or the client application may handle the caching itself. The cache 114 may reside on the same computer as the client application computer, or the cache may be on a separate computer.

In order to keep the client-side cache 114 synchronized with the server-side master database 112, the client application may register synchronization entries with the scheduler, specifying an associated synchronization callback and a time for the scheduler to invoke the callback. A synchronization entry is similar to the request entries described above. While request entries correspond to specific client requests, such as an information lookup command initiated by a user, synchronization entries correspond to tasks such as maintenance operations that the client application needs to perform periodically. When a synchronization callback is invoked, the callback may perform the appropriate synchronization task and then inform the scheduler of the next time to invoke the callback again. Synchronization is discussed in more detail below.

Figure 3:
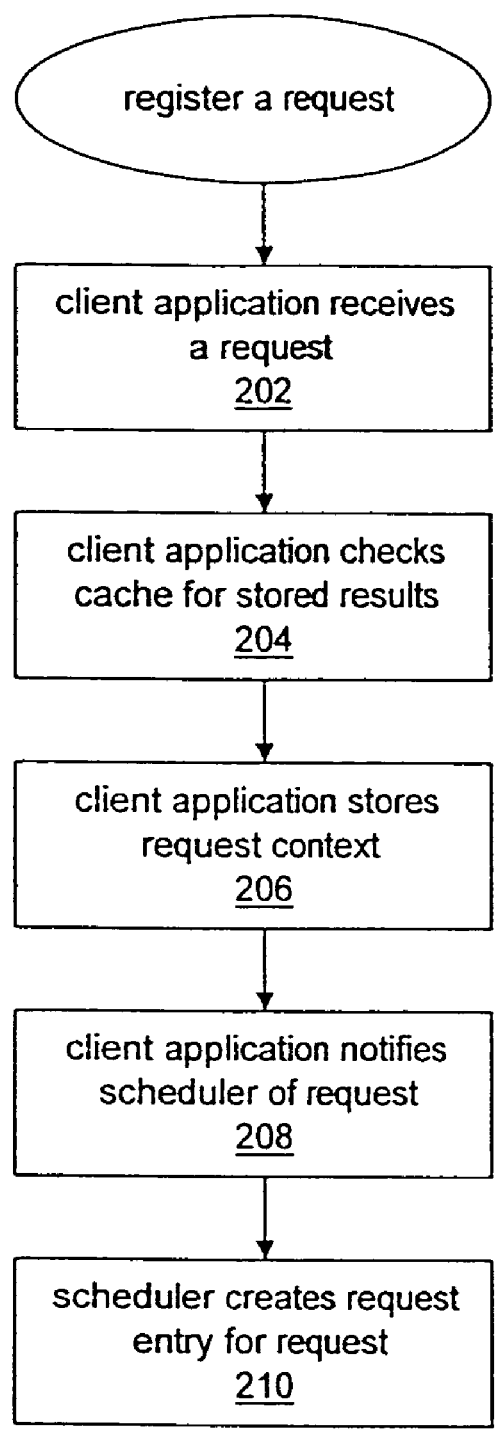
FIG. 3 is a flowchart diagram illustrating one embodiment of a client application registering a request entry with the scheduler.

FIG. 3—Registering a Request

FIG. 3 is a flowchart diagram illustrating one embodiment of a client application registering a request entry with the scheduler. In step 202, the client application receives a request or command, e.g., from the user or from another computer process. For example, a healthcare service provider application may receive a command to look up a patient record, or to file an insurance claim, etc. In step 204, the client application may check a client-side cache for the request results. For example, in the patient lookup example, the cache may already contain the patient's record as a result of a previous lookup of the same patient. Step 204 may not be applicable in some situations. For example, the client application may not necessarily maintain a client-side cache, or it may not be appropriate to check the cache for certain types of requests, such as the example request to file an insurance claim.

If the request could not be satisfied in step 204, then in step 206 the client application stores the request context, such as the appropriate parameters to use in sending the request to the server. The client application may store the request context in any of various ways. In one embodiment, the request context is stored in a database, and the client application receives a key value identifying a corresponding database record. In other embodiments, the client application may store the request context in other ways, e.g., in an internal data structure.

In step 208 the client application registers a request entry for the request with the scheduler, e.g., by utilizing an API provided by the scheduler. When registering the request entry, the client application may provide a key value for the scheduler to associate with the entry, such as the database record key value mentioned above. The client application may also inform the scheduler of an application callback for the scheduler to invoke when the request is to be performed, i.e., a portion of the client application to be invoked in order to communicate with the server to perform the request.

Application callbacks may be represented, registered, and invoked in any of various ways. For example, the client application may provide the scheduler with a function pointer, an object-oriented style object instance or the name of a class to instantiate, an interface to an independent software component, etc. In one embodiment the client application provides the scheduler with the name or description of an application callback, and the scheduler utilizes a service to map the name or description to a handle to a callback to be invoked.

The client application may also specify various attributes to set for the request entry. For example, the client application may specify that the request requires exactly-once semantics, i.e., that it is important that the request be performed exactly once. Requests requiring exactly-once semantics generally cause server-side side effects, such as causing a master database record to be written. The scheduler may later handle error recovery for a request differently, depending on whether or not the request requires exactly-once semantics. Error recovery is discussed in detail below.

In step 210 the scheduler creates a request entry for the request, comprising information such as the associated key value, application callback, and other attributes. Request entries preferably also comprise a status field indicating the current state of the request entry. For example, when a request entry is first registered, the scheduler may assign the entry a status of "awaiting connection". Other possible status values are discussed below. The scheduler may also assign a job ID to the request entry, to be used for error recovery. The use of job IDs is discussed below. Various steps of FIG. 3 may be altered, omitted, added, combined, or may occur in different orders, as appropriate to a particular system or request type. For example, step 202 may be omitted if the client application needs to perform a server request as a result of its own program logic instead of in response to a request received from a user or another program. As another example, the client application may check for a network connection before storing the request context and registering a request entry. If a network connection is currently available, the client application may attempt to use the network connection to send the request immediately, in order to avoid the overhead of registering the request with the scheduler and storing/retrieving the request context.

Figure 4:
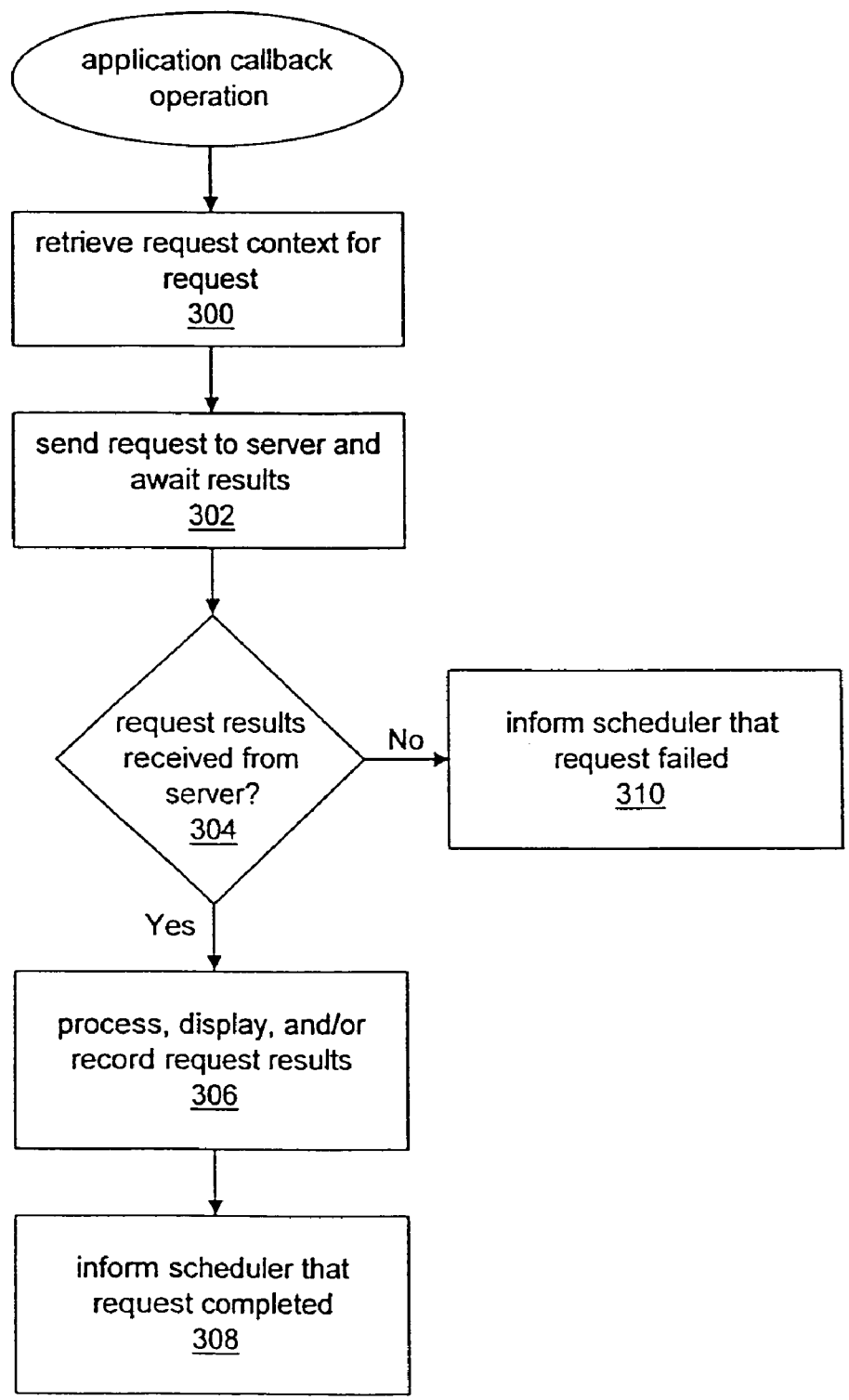
FIG. 4 is a flowchart diagram illustrating one embodiment of the operation of an application callback.

FIG. 4—Application Callback Operation

As discussed above, when a request entry is registered, the scheduler is informed of an appropriate callback to invoke when a network connection is available to send the request. FIG. 4 is a flowchart diagram illustrating one embodiment of the operation of an application callback when it is invoked.

When the scheduler invokes an application callback for a request entry, it may pass the application callback the key value and the job ID associated with the request entry. In step 300 the application callback uses the key value to retrieve the request context, such as request parameters, stored previously in step 206 of FIG. 3. In step 302 the application callback uses the network connection to send the request to the server, along with any request parameters and possibly the job ID. After sending the request, the application callback waits on the server to return the results of the request or to acknowledge that the request was performed. Note that the use of the term "wait" does not necessarily imply synchronous communication; the application callback may communicate with the server asynchronously. The application callback may use any of the various communication protocols to send the request to and receive results from the server, as appropriate for the particular type of application, computing platform, network type, etc.

It is possible that the network connection will be prematurely terminated after the application callback sends the request to the server, and the callback thus receives no results from the server. For example, the application user may forcibly close the connection, or a network or server problem may cause the connection to break. In this case, the application callback is preferably notified that the network connection was terminated, e.g., by a notification from the operating system.

In step 304, if the application callback determines that no results will be received from the server, e.g., due to a terminated network connection, then in step 310 the application callback informs the scheduler that the request failed. The scheduler may handle failed requests differently, depending on particular attributes set for each request entry. For example, if a request entry is marked as requiring exactly-once semantics, as described above with reference to FIG. 3, then the scheduler may update the status field of the request entry with a status such as "recovery needed". A status of "recovery needed" indicates that the server must be queried to determine whether the request was actually completed before the client application attempts to submit the request again. The treatment by the scheduler of request entries marked as "recovery needed" is discussed below for FIG. 7. If a request does not require exactly-once semantics, then the request entry status may simply be reset to "awaiting connection" so that the request can be submitted again once a network connection is available.

If the application callback does receive the request results from the server in step 304, then in step 306 the application callback processes the results appropriately. The processing performed on the results by the application callback may depend on the particular type of request. The application callback may invoke other parts of the application program to process the results. For example, a user interface component may be invoked to display the results of the request to the user, if appropriate. The results may also be cached in a client-side cache, such as illustrated in FIG. 2B, if appropriate, so that they may be reused later without having to request them from the server again.

In step 308 the application callback informs the scheduler that the request was successful. The scheduler may then act appropriately, e.g., by deleting the corresponding request entry. The application callback may also delete the stored request context once a request has successfully completed.

Figure 5:
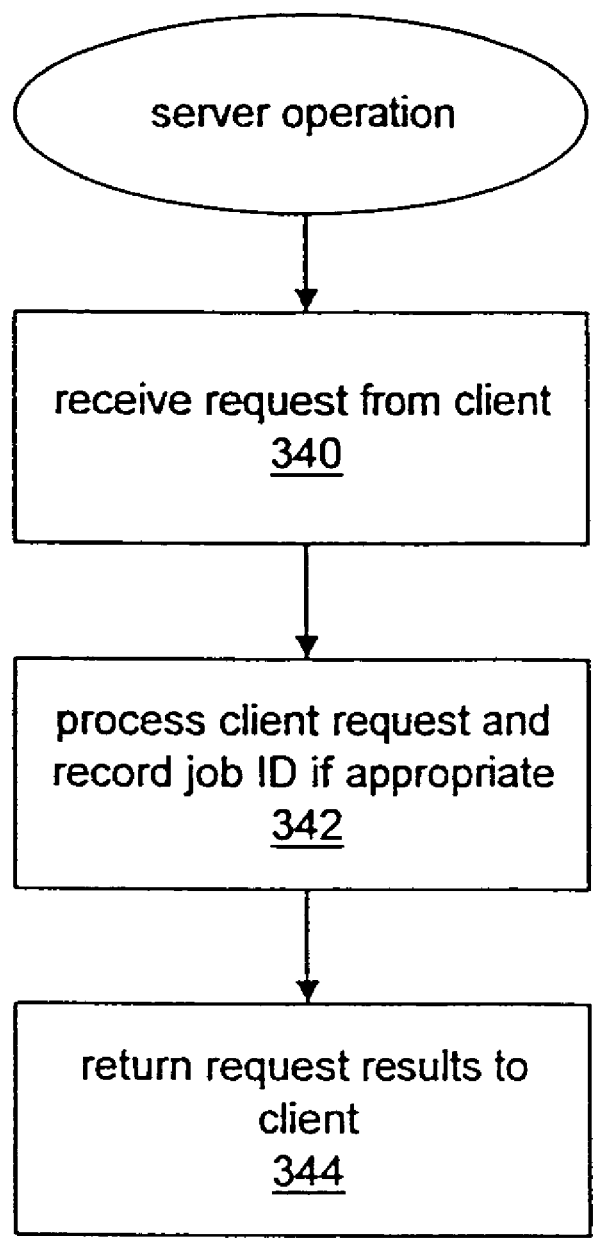
FIG. 5 is a flowchart diagram illustrating one embodiment of the server-side operation upon receiving a client request.

FIG. 5—Server Side Operation

FIG. 5 is a flowchart diagram illustrating the server-side operation upon receiving a request from a client application callback. In step 340 the server receives a request from the client. In step 342 the server processes the request appropriately, depending on the request type. For example, the server may retrieve information from a database, write information to a database, perform an electronic commerce transaction, etc. As discussed above with reference to FIGS. 1 and 2, the server may communicate with various other applications or servers in order to process the request. In step 344 the server returns the results of the request, if any, to the client or acknowledges to the client that the request was completed. As discussed above, the client and server may use any of various protocols for communication.

As stated above, an application callback may send a job ID along with a request. As a part of processing the request in step 342, the server may record this job ID to indicate that the request was actually completed. As described below, the scheduler may later query the server, if necessary, to determine whether the request was completed. For example, as described above, the client's network connection to the server may be prematurely terminated after the client sends the request to the server. If the server receives the request before the connection breaks, the request may be completed, but the server would not be able to return the results to the client. In this case, the recorded job ID may later be used to determine that the request was in fact performed. As discussed above, it may be important to ensure that certain requests are not performed more than once.

Figure 6:
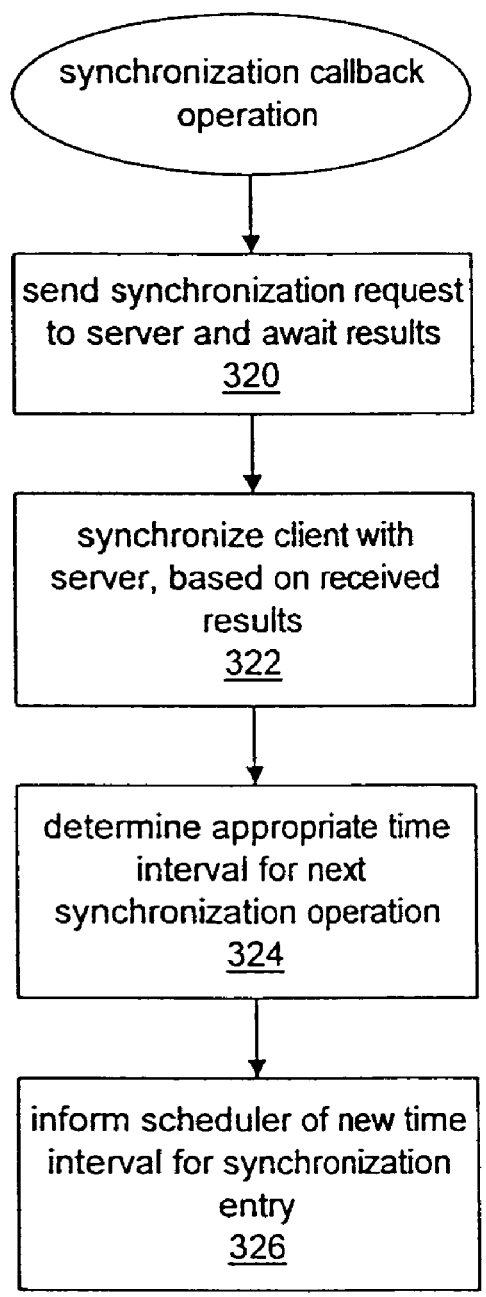
FIG. 6 is a flowchart diagram illustrating one embodiment of the operation of a synchronization callback.

FIG. 6—Synchronization Callback Operation

As described above, a client application may register a special type of request entry with the scheduler, referred to as a synchronization entry. Synchronization entries may correspond to scheduled tasks that a client application needs to perform. In particular, a client application may register synchronization entries that run periodically in order to keep a client-side cache in sync with a server-side master database. Just as other request entries have an associated application callback which the scheduler invokes when a network connection is available to perform the request, synchronization entries have an associated synchronization callback which the scheduler invokes when a network connection is available and when the entry is due to run. FIG. 6 is a flowchart diagram illustrating one embodiment of the operation of a synchronization callback.

In step 320, the synchronization callback sends the synchronization request to the server and waits for the server to return the request results. Step 320 may be performed in various ways, depending on the type and volume of data to be synchronized, the mechanisms used to store the data on the client and server sides, etc. As noted above, in one embodiment, the client-side cache is implemented using a database. Depending on the complexity of the data to be cached, the client-side database may comprise separate tables or sets of tables for different classes of data, and separate synchronization callbacks may be responsible for managing each class of data.

For a given data class, a synchronization callback may retrieve a list of database record IDs and modification times for each record from the client-side database and send this information to the server. The record IDs sent by the client should match IDs which are maintained on the server side, so that the server can map each client-side record to the corresponding server-side record. The server may query the server-side master database for any records that have been deleted and hence the ID is no longer valid, or have been updated and hence have a modification time more recent than what the client has, or are new and hence have an ID that is not in the list sent by the client. The server can then return this information to the client, e.g., as three lists, one for items to be deleted, one for items to be updated, and one for new items to be added. The synchronization callback and server may use any of various communication or data protocols to exchange information.

In step 322 the synchronization callback receives the results from the server and uses them to update the client-side cache. Step 322 may be performed in various ways, depending on the type of data involved and how it is cached. For example, step 322 may involve performing client-side database delete, update, and insert operations, or any other operations necessary to maintain data integrity.

In step 324 the synchronization callback determines the appropriate time interval for when the synchronization operation is to be performed next. This time interval may be determined in different ways, as appropriate for a particular system, application, or operation. For example, for tasks that are required to run at regular intervals, the time interval may be constant. The time interval may also be computed based on other information, such as the statistics for the current synchronization operation. For example, if the current synchronization operation required many updates to the client-side cache, the next operation may be scheduled to run sooner, in an effort to keep the client data fresher. Various other criteria may also be applied in determining the time interval, e.g., local network bandwidth usage, etc.

In step 326 the synchronization callback informs the scheduler of the next time for the synchronization entry to run. If the synchronization entry was an entry for a task scheduled to run only once, the synchronization callback may inform the scheduler that the synchronization entry can be deleted.

Similarly to the situation described above for application callback operation, it is possible that the synchronization callback will not receive results from the server after sending the request to the server in step 320. In this case, the synchronization callback preferably informs the scheduler that the synchronization entry should run again immediately, e.g., by setting a very low or zero value for the time interval in step 324. In this case, the scheduler may invoke the synchronization callback again as soon as a network connection is re-established. Other error recovery approaches are also possible. For example, if a synchronization request required exactly-once semantics, then a similar approach could be taken as for the application callback case, where the entry is marked with a status such as "recovery needed".

Various steps of FIG. 6 may be altered, omitted, added, combined, or may occur in different orders, as appropriate to a particular system, application, or synchronization operation. For example, steps 320 and 322 may be broken into a series of interleaved steps of querying the server for changes in certain portions of the data, making appropriate client-side updates, and then performing more queries based on the results received.

Figure 7:
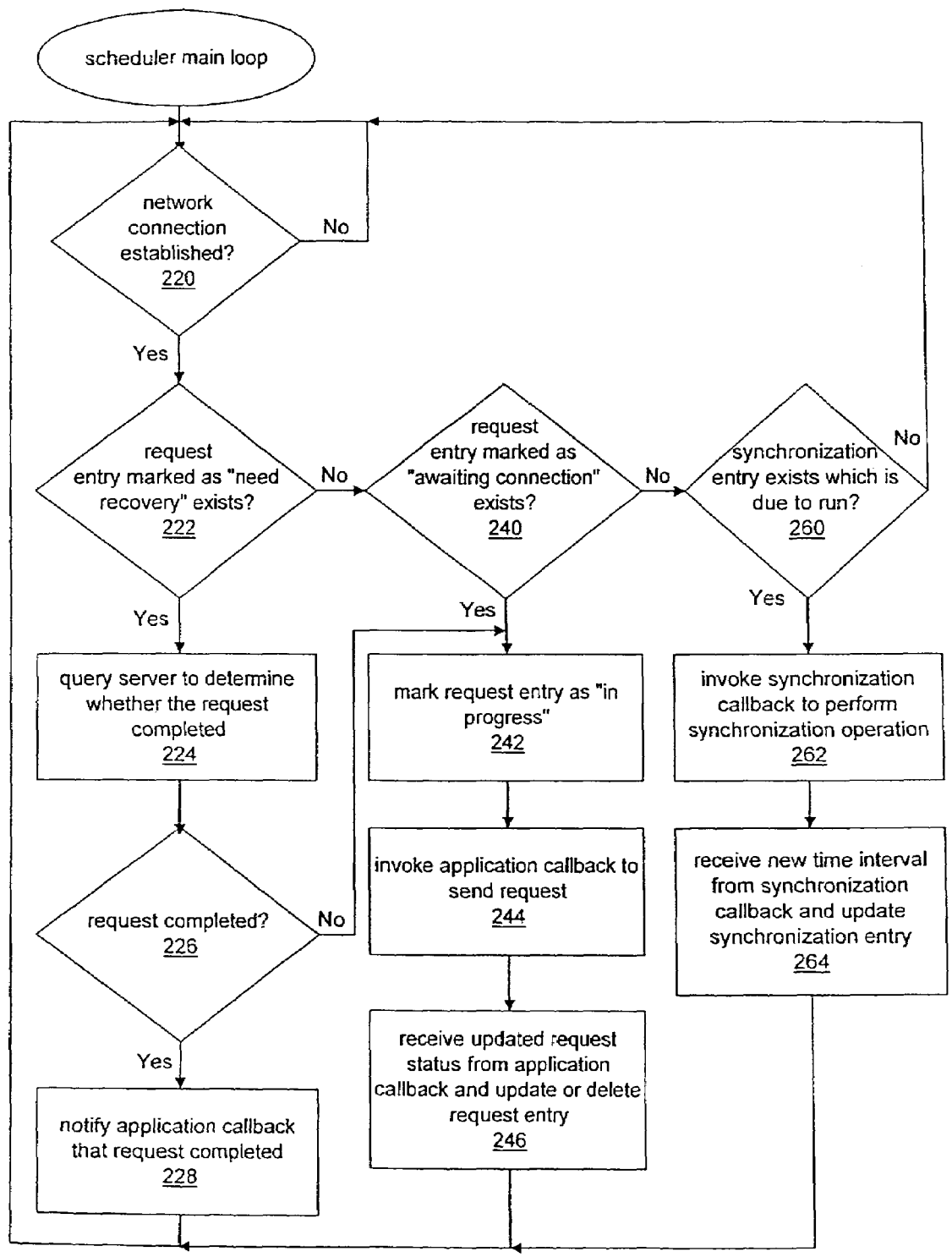
FIG. 7 is a flowchart diagram illustrating one embodiment of a main "cycle" that the scheduler may execute.

FIG. 7—Scheduler Main Loop

Besides accepting requests from client applications to register request entries and synchronization entries, it is also the scheduler's responsibility to invoke application and synchronization callbacks at appropriate times and to handle recovery from failed requests. FIG. 7 is a flowchart diagram illustrating one embodiment of a main "cycle" that the scheduler may execute to perform these tasks.

In step 220 the scheduler determines whether a network connection is established. If not, then no further action is taken until the next iteration. The "cycle" of FIG. 7 may of course be implemented in various ways, as appropriate for a particular environment and application. For example a thread or process may execute the steps continuously, or may sleep and wakeup periodically, etc.

If a network connection is established, then in step 222 the scheduler checks whether any request entries are marked with a status of "recovery needed". As discussed above with reference to FIG. 4, request entries may be marked by the scheduler as "recovery needed" if the request entry's application callback was invoked and the application callback sent the request to the server but did not receive a response, e.g. because the network connection was prematurely terminated. The scheduler may also mark entries with a status of "recovery needed" in certain other circumstances, as described below.

If a request in need of error recovery is identified in step 222, then in step 224 the scheduler queries the server to determine whether the server actually completed the request. For example, the server could have received and completed the request and returned the results, but the client's network connection may have been lost while the results were in route from the server to the client. As described above, the scheduler may assign a job ID to a request entry when it is registered, and the application callback may send this job ID to the server along with the request, and the server may log the job ID after the request is actually performed. Thus, in one embodiment the scheduler may perform step 224 by querying the server to determine whether the job ID of the request entry in question was logged. In other embodiments, the determination of whether the request completed may be made using other methods.

In step 226 the server response is analyzed to determine whether or not the request completed. If it did complete, then in step 228 the scheduler may notify the application callback associated with the request entry that the request previously sent by the callback did in fact succeed. The application callback may then proceed accordingly. For example, the application may log the completed action or display a message to the user, e.g., that a document was successfully submitted. If the application callback requires result information returned from the server in order to perform further processing, the server may be contacted to obtain this information without actually re-performing the entire request. For example, for a document submission request, an application callback may contact the server to obtain the current status of the document, without actually submitting the document again. After the scheduler notifies the application callback of the completed request in step 228, the scheduler may treat the request entry accordingly, e.g., by deleting the request entry. From step 228, the flowchart logic proceeds to the beginning of the cycle.

If the scheduler determines in step 226 that the server did not complete the request in question, then the request must be re-sent. The flowchart logic thus proceeds to step 242, where the request entry is marked with a status of "in progress", and the associated application callback is invoked in step 244 to re-send the request.

Note that in some situations synchronization entries may also be marked with a status of "recovery needed", as discussed above. Synchronization entries in need of error recovery may be handled similarly as described above for request entries. If it is determined that a synchronization entry marked as "recovery needed" was not carried out by the server, then the time for the next invocation of the entry may be set to a low or zero value, as described above, so that the entry will be run again soon.

If no requests in need of error recovery are identified in step 222, then in step 240 the scheduler checks whether any request entries are marked with a status of "awaiting connection". If a request waiting for a network connection is identified, then in step 242 the scheduler marks the request with a status of "in progress", and the associated application callback is invoked in step 244 to send the request. The "in progress" status value can be used to recover from client-side crash situations, as discussed below with reference to FIG. 8.

After the application callback is invoked in step 244, the application callback may operate according to the flowchart illustrated in FIG. 4. As shown in steps 308 and 310 of FIG. 4, the application callback may inform the scheduler of the request status after it sends the request to the server, e.g. by informing the scheduler that the request failed or completed successfully. In step 246 the scheduler receives this information from the application callback and acts accordingly, e.g., by deleting the request entry for successfully completed requests, or resetting the request entry status to "awaiting connection" for failed request entries not requiring exactly-once semantics, or setting the request entry status to "recovery needed" for failed request entries requiring exactly-once semantics, or performing any of various other types of updates, as appropriate to a particular embodiment. From step 246, the flowchart logic proceeds to the beginning of the cycle.

If no requests awaiting a network connection are identified in step 240, then in step 260 the scheduler checks whether any synchronization entries are due to run. If no synchronization entries are due to run, then the flowchart logic proceeds to the beginning of the cycle. If a synchronization entry is due to run then in step 262 the synchronization callback associated with the synchronization entry is invoked, and the synchronization callback proceeds, e.g., according to the flowchart of FIG. 6. As shown in step 326 of FIG. 6, upon completion, the synchronization callback may inform the scheduler of a new time or time interval for running the synchronization entry again. In step 264 of FIG. 7, the scheduler receives this information from the synchronization callback and updates the synchronization entry accordingly. From step 264, the flowchart logic proceeds to the beginning of the cycle.

It is noted that FIG. 7 illustrates one embodiment of a cycle which the scheduler may perform to manage request and synchronization entries. Various steps of FIG. 7 may be altered, omitted, added, combined, or may occur in different orders, as appropriate to a particular system or application. For example, although described above as a series of steps in which the scheduler may process one entry with each pass through the cycle, multiple entries may of course be processed concurrently, e.g., by starting a thread for each callback to be invoked. Also, the cycle is described hierarchically, in which the scheduler first checks for entries needing error recovery, then for request entries waiting for a network connection, and then for synchronization entries due to run. The scheduler may be programmed to follow such a hierarchy in order to give priority to particular classes of entries, e.g., by ignoring synchronization entries if request entries are waiting. Alternatively, all entries ready to run may be treated with equal priority. Other priority mechanisms may also be used, including time-based priority, explicit priority assignments when entries are registered, etc.

Other enhancements or modifications may also be made to the scheduler, as appropriate for a particular system or application. For example, in step 220 the scheduler may check not only to see whether a network connection is currently established, but may also check certain other conditions. For example, for environments with limited network bandwidth, the scheduler may only process request entries if the local network usage is currently below a certain threshold level. As another example, if no network connection is detected in step 220, the scheduler may attempt to automatically establish a network connection under certain conditions, such as a large amount of pending request entries or a long elapsed time since the last requests were sent.

Figure 8:
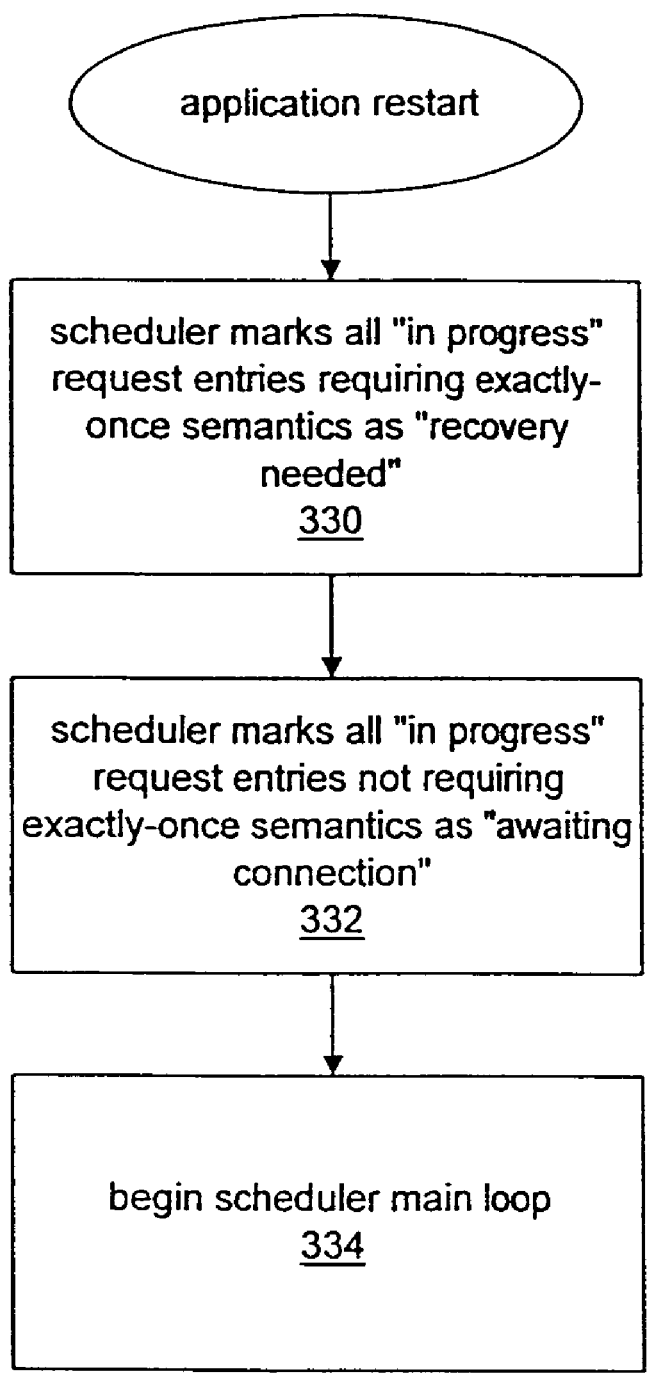
FIG. 8 is a flowchart diagram illustrating one embodiment of an error recovery process that the scheduler may perform upon restart of the application.

FIG. 8—Application Restart

As noted above, it is possible that the client application crashes or is forcibly shut down by the user. As described above, the application may be architected in various ways so that the scheduler may be considered a part of the application, or the scheduler may be an entity independent of and used by the application. In either case, the scheduler is preferably implemented so that scheduler entries are stored persistently, for example by storing them in a database. Upon application restart, the scheduler may perform an error recovery process. One embodiment of this process is illustrated in the flowchart diagram of FIG. 8.

The request entries that need to be examined upon application restart are the entries marked with a status of "in progress". As described above, when a request entry is registered, the scheduler may be informed whether the request requires exactly-once semantics. In step 330 of FIG. 8, the scheduler updates the status of the "in progress" entries requiring exactly-once semantics to "recovery needed". Thus, in step 222 of FIG. 7, these request entries will be checked to see whether the requests already completed.

If a request does not require exactly-once semantics then the client can simply resubmit the request. Thus in step 332 of FIG. 8, the scheduler updates the status of the "in progress" entries not requiring exactly-once semantics to "awaiting connection". After performing these error recovery steps, the scheduler may then begin the FIG. 7 process of periodically checking for a network connection, invoking application callbacks, etc. Other steps may of course occur upon application start or restart. For example, an application may schedule certain synchronization entries at startup.

FIG. 9—Web Applications

Figure 9A:
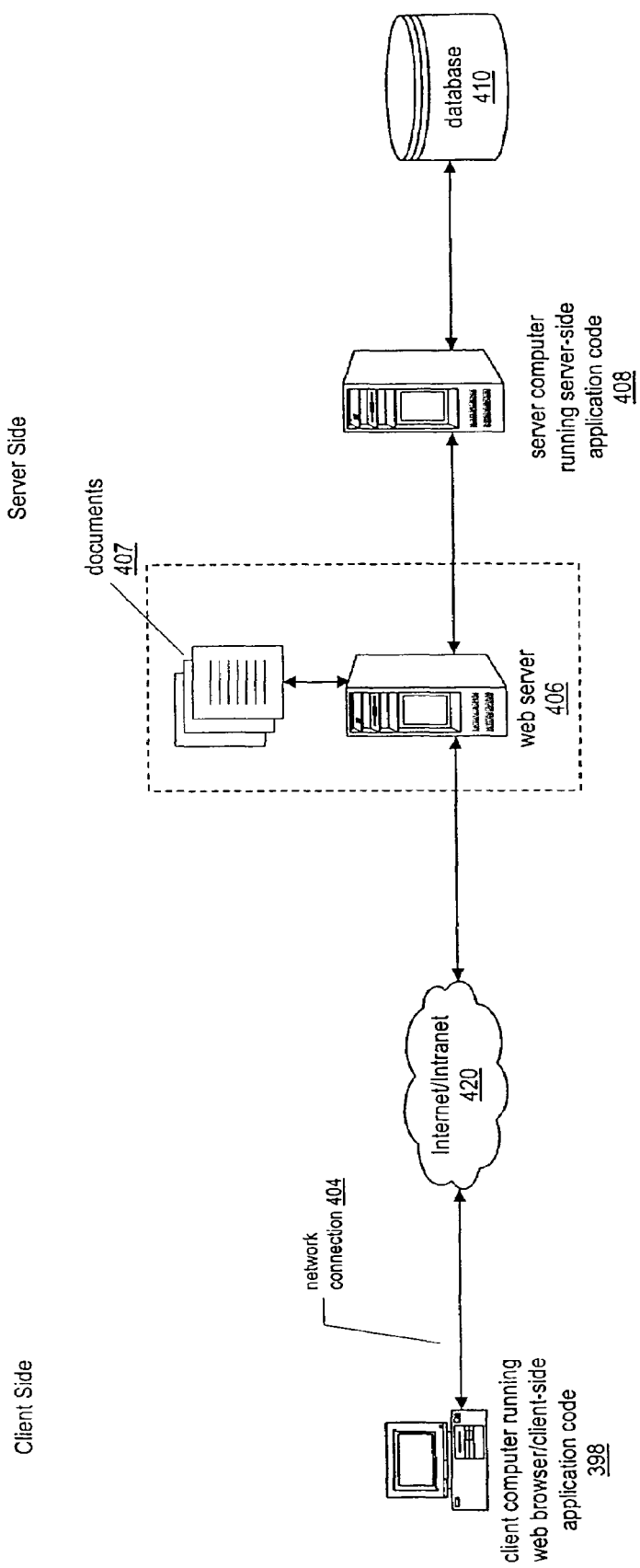
FIG. 9A illustrates a typical web-based application architecture.

As described above, many types of client/server applications may be constructed as described herein to enable the client-side of the application to operate offline from the server. In particular, the present system and method may be applied to web applications. FIG. 9A illustrates a typical web application architecture. There are, of course, many possible variations in web application architectures, and FIG. 9 is exemplary only. In general, a web application may be defined as an Internet or Intranet-based application comprising a collection of resources that are accessible through uniform resource locators (URLs). The resources may include web pages comprising markup language code, such as HTML or XML code, scripting code such as Javascript or VBScript code, or other types of elements. The resources may also include any of various types of executable programs or components, such as CGI programs, Java servlets, JavaBeans components, CORBA components, downloadable code such as Java classes or ActiveX components, etc. The resources may also include any other type of resource addressable through a URL. The example of FIG. 9A illustrates a client computer 398 which may run a web browser, such as the Netscape Navigator or Microsoft Internet Explorer web browsers, and/or may run application-specific client-side application code. For example, the client computer 398 may run code packaged in various forms that operates under control of a web browser, such as Java applets or ActiveX components. It is noted, however, that the client computer 398 may not necessarily run a web browser per se, but may run any of various types of client-side applications that include web-browsing or web communication functionality. For example, Microsoft Corp. provides programming interfaces enabling applications to incorporate various web-browsing capabilities provided by the Microsoft Internet Explorer code base. Web applications often comprise client-side code that takes advantage of the familiar interface and popularity of web browsers, utilizing them to handle the user interface/presentation portions of an application, and often the network communication needs as well.

The web browser and/or client-side application code may run in any type of client computer 398. For example, the client computer 398 may be a desktop computer or workstation running any of various operating systems, such as Windows, Mac OS, Unix, etc., or may be a portable computing device, such as a personal data assistant, smart cellular phone, etc. The client computer 398 may use a network connection 404 for communicating with a web server 406 via a network 420, such as the Internet or an Intranet. The client network connection may be a connection of any type, such as a PPP or SLIP dialup link, an Ethernet or token ring connection, an ISDN connection, a DSL connection, a cable modem connection, any of various types of wireless connections, etc. Although web applications are often associated with particular communication protocols, such as HTTP or SSL, it is noted that any communication protocol, including TCP-based protocols and UDP-based protocols, may be used to communicate over the network 420.

As the web server 406 receives a request from a client computer 398, the web server may treat the request differently, depending on the type of resource the request references. For example, if the request references a document 407, such as an HTML document, then the web server may process the request itself, e.g., by retrieving the document from the web server's local file system or from a local cache and returning the document to the client computer. For other types of requests, e.g., requests referencing executable components, such as Java servlets, JavaBeans components, C program modules, CORBA components, etc., the web server may broker the request to a server computer 408 running server-side application code, e.g. through interfaces such as CGI, ISAPI, NSAPI, etc. The server 408 may interface with various types of other servers or systems. For example, as illustrated in FIG. 9A, the server 408 may communicate with a database 410.

As noted above, the web application architecture illustrated in FIG. 9A is exemplary only, and many variations are possible. For example, the server side may include a firewall, multiple web servers, etc. There may not be a separate application server, or some executable components, such as CGI programs, may run on the web server instead of on a separate application server. The server side may include a cluster of application servers instead of a single one. Various other types of servers or systems may interface with the server side, such as legacy systems, multiple databases, etc. The client computer 398 may communicate directly with another type of server, e.g., an application server, rather than passing requests through a web server. These are only a few of the possible architectural variations.

Figure 9B:
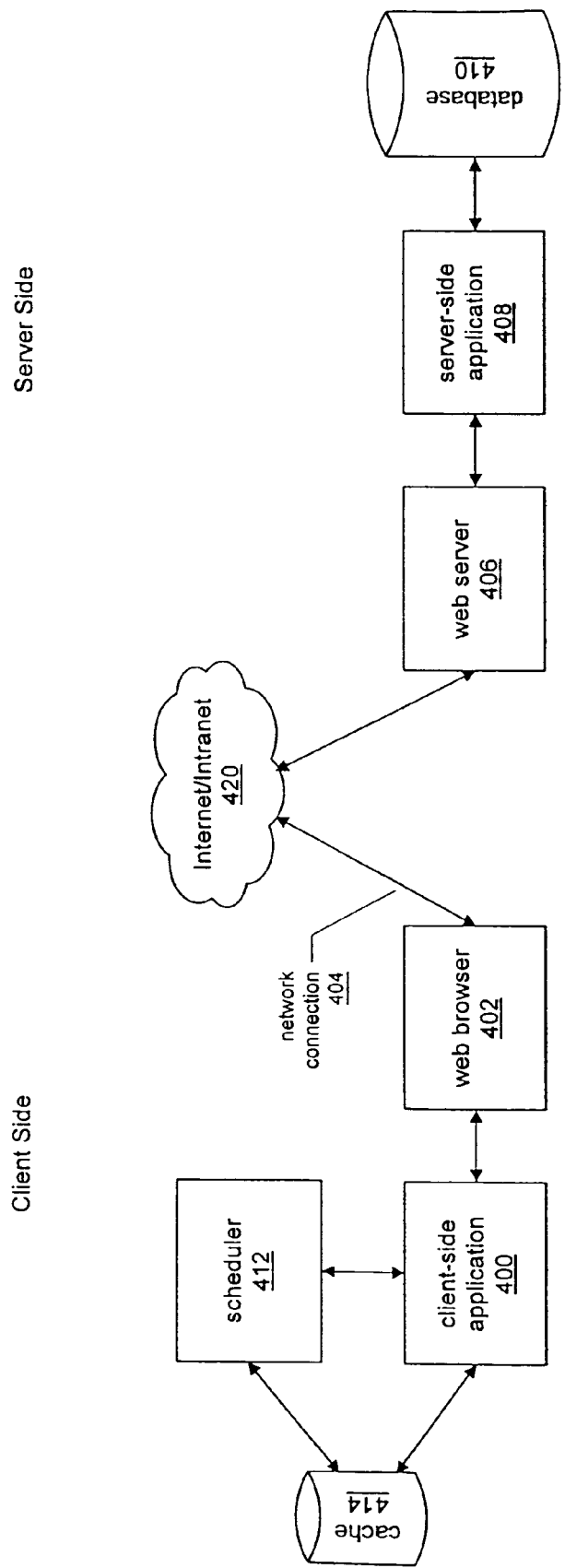
FIG. 9B illustrates one embodiment of a web application architecture with enhancements allowing the client application to operate offline from the server.

FIG. 9B illustrates one embodiment of a web application architecture, in which the client-side of the web application is enabled to operate offline from the server.

FIG. 9B appears similar to FIG. 9A, but the client-side application is shown in more detail and with additional components, in order to illustrate the use of a scheduler component to manage requests to the server.

As shown in FIG. 9B, the client-side application 400 may interface with a scheduler 412. In the FIG. 9B example, the scheduler is illustrated as a separate module or component from the client application. For example, the scheduler may be constructed as component according to a software component model, such as ActiveX/COM, CORBA, JavaBeans, etc., component models. In one embodiment, the scheduler is implemented as a COM component. The COM IDL code describing this component embodiment's interfaces is included as Appendix A. The scheduler preferably executes on the same computer as the client application, but may also execute on a different computer, e.g., on a computer connected to the client application computer via a LAN. Also as discussed above, in an alternative embodiment, the scheduler may not be implemented as a separate module or component, but may be more tightly integrated with the rest of the client-side application code.

As shown in FIG. 9B, the scheduler may persistently store entries in a store 416, such as a database. Also, as discussed above, the client-side application may maintain a client-side cache 414, e.g., using a database. The scheduler store 416 and the cache 414 may be implemented in various ways, and may be kept separate or may be integrated, e.g., by using a single client-side database. In one embodiment, Microsoft's JET database is used by the client-side application. For more information on the JET database engine, please refer to the appropriate documentation, available from Microsoft Corp.

As discussed above with reference to FIG. 9A, the client-side application preferably includes web browsing, web display, and/or web communication abilities. The client application code may implement the web browsing/display/communication functionality itself, or the client application may interface with third-party modules or components in order to achieve this functionality. Although FIG. 9B illustrates a single module or component 402 providing these abilities, the client application may also interface with separate modules or components providing these abilities. In one embodiment, the client-side application 400 utilizes the Microsoft Internet Explorer code base in order to provide the abilities shown in module 402. For more information on interfacing with the Internet Explorer code base, please refer to the above-incorporated references.

It will be readily apparent to those skilled in the art how the client-side of the Web application may utilize the scheduler 412 to manage requests, in order to enable offline operation, as discussed above. The client-side application code 400 may be configured to intercept use requests, such as clicks on hypertext links, menu commands, etc., as appropriate for a particular application environment. The application may then create and register an appropriate request entry for the request with the scheduler, specifying an application callback to associate with the request entry, as described above. When the client computer is then connected to the network and the application callback is invoked, the application callback may send the request to the server. As noted above, in one embodiment, the application may interface with the Microsoft Internet Explorer code base. In this embodiment, an application callback may utilize COM interfaces provided by the IE code base to intercept user actions, send the request using protocols such as HTTP or HTTPS, etc.

Healthcare Web Application Example

As described above for FIG. 9, web-based applications may be architected to reduce their dependence on a server by interfacing with a scheduler and possibly utilizing a client-side cache. Web-based healthcare applications in particular may benefit from an ability to operate offline from the server. In one example, a healthcare connectivity application available from Healtheon/WebMD employs a scheduler, as described above. This web-based healthcare application connects various members of the healthcare industry, such as physicians, insurance payers, pharmacies, etc., allowing them to perform the business and work of healthcare efficiently. For example, physician office staff may check a patient's insurance eligibility, file an insurance claim for the patient, and perform many other functions, all using the same application. Insurance providers may then receive the filed insurance claim, process it, etc., using the same application or a variant of the same application.

As discussed above, there may be many reasons for desiring to reduce the dependence of the client side of such an application from the server side. For example, a small office, such as a small physician office, may not have dedicated network connections available, may have to pay for connection time on a use basis, may have a limited amount of LAN bandwidth to spare, etc. For these reasons and others, it may be desirable to enable the client side of the application to operate offline. For example, office staff may use the application in a disconnected state for most of the day, only establishing a network connection at certain times or when server contact is immediately necessary, such as when an important search request cannot be satisfied with data from the client-side cache. The application may be configured to automatically open or close a network connection, as appropriate, or opening and closing the network connection may be under user control.

Certain healthcare workers may also see a significant performance increase as a result of the application architecture. For example, a typical action performed by a physician staff member may be to lookup information, such as looking up patients' insurance eligibility, etc. As described above, requests which obtain such information from the server can often be avoided by instead obtaining the information from a client side cache. In one embodiment, the application may be enabled to allow users to specify certain data sets that are automatically or manually downloaded from the server and cached so that they are always available. Another typical action performed by healthcare workers may be filing documents, such as filing an initial or an updated insurance claim. Since most documents may not need to be filed immediately, it may be beneficial to submit the filing requests to the server together in a batch.

In one embodiment, the application is configured to cache the following classes of data on the client side:

patient roster information eligibility records for patients in the roster list of submitted authorizations and claims authorizations made by another provider to a particular office lists of providers to whom patient referrals are frequently made frequently used codes inbox messages for each user For each class of data, the application may maintain information in a client-side cache, e.g., as a set of tables in a database. Also, for each class of data, the application may register a synchronization entry with the scheduler, as described above.

User Authentication

Security is a concern for many types of networked applications. Applications constructed according to the system and method described herein may comprise means for performing user authentication. For example, user account information for a particular workstation, e.g., for a particular physicians' office, may be downloaded from the server and stored in an encrypted form in a client-side database. This user account information may be kept synchronized with server-side data, using the methods described above.

When a user logs in to the workstation, the user may provide his password to the client-side application, and the password may be checked against the stored information. Assuming that the password is correct, the user's username and password may be stored in a client database as part of the user's session information. Each time that the user submits a request during his current session, a request entry may be registered with the scheduler as usual, and a reference to the user's session information may be stored along with the request context. When the client computer later becomes connected to the server, the client application may send the user's stored session information to the server, in order to receive an authentication token. Then, as each request entry associated with the user's session is performed by the appropriate application callback, this authentication token may be sent along with the request, in order to ensure application security. The authentication token may be implemented in any of various standard ways.

The client-side application may also be configured to store function access control information for each user on the client side, so that when the client computer is disconnected from the network, the application can still determine which operations are allowed for particular users, and can display appropriate error messages, etc.

Saving and Restoring Forms

Some types of requests may involve submitting form information. For example, a common operation for a healthcare application may be to enter and submit health insurance forms. The client application may include means for error recovery for submitted forms. When a user submits a form, the form information may be stored as a part of the request context for the submit request. As discussed above, a reference to the user's session information may also be stored with the request context.

The application may include "restore" functions operable to retrieve forms. If the server detects errors in the form when it is submitted, the appropriate restore function may be called to allow the user to correct the errors. Of course, since the form submission may occur at a later time, the user may not be logged in when the form is submitted. In this case, the application preferably maintains an inbox for each user, and the reported errors may be routed to the user's inbox. The application may later use the restore function to display the form to the user, once the user is logged in again.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A method for sending a request from a client computer to a server computer, wherein the client computer is connected to the server computer via a network, wherein the server computer runs server-side code associated with a client/server application, wherein the client computer runs client-side code associated with the client/server application, the method comprising:

the client-side code registering a request entry with a client-side scheduler while the client is unable to established a connection to the server computer over the network, wherein the request entry represents the request to be sent from the client computer to the server computer;

the client-side scheduler storing the request entry until a connection from the client computer to the server computer can be established for use by the client-side code;

the client-side scheduler detecting when a connection from the client computer to the server computer is established;

the client-side scheduler notifying the client-side code that the connection from the client computer to the server computer over the network is established;

the client-side code using the connection to the server computer to send the request to the server computer;

wherein said client-side code registering a request entry with the client-side scheduler comprises the client-side code storing request context information for the request entry; and wherein said client-side code using the connection from the client computer to the server computer to send the request to the server computer comprises the client-side code retrieving the request context information to formulate the appropriate request to send to the server computer.

2. The method of claim 1, wherein said client-side code registering a request entry with the client-side scheduler comprises the client-side code informing the client-side scheduler of a callback routine to associate with the request entry;

wherein said client-side scheduler storing the request entry comprises the client-side scheduler storing information identifying the callback routine;

wherein said client-side scheduler notifying the client-side code that the connection from the client computer to the server computer is established comprises the client-side scheduler invoking the callback routine.

3. The method of claim 1, wherein said client-side code storing request context information for the request entry comprises the client-side code storing the request context information in a database.

4. The method of claim 3, wherein said client-side code registering a request entry with the client-side scheduler comprises the client-side code informing the client-side scheduler of a database key identifier for the request context information stored in the database;

wherein said client-side scheduler storing the request entry comprises the client-side scheduler storing the database key identifier;

wherein said client-side scheduler notifying the client-side code that the connection from the client computer to the server computer is established comprises the client-side scheduler passing the database key identifier to the client-side code;

wherein said client-side code retrieving the request context information for the request entry comprises the client-side code using the database key identifier to retrieve the request context information from the database.

5. The method of claim 1, wherein the that the client-side code needs to send to the server computer requires exactly-once semantics;

wherein said client-side code registering a request entry with the client-side scheduler comprises the client-side code informing the client-side scheduler that the request requires exactly-once semantics;

wherein said client-side scheduler storing the request entry comprises the client-side scheduler storing information specifying that the request requires exactly-once semantics;

wherein, in the case of an error during said client-side code using the connection from the client computer to the server computer to send the request to the server computer, the method includes providing error recovery for the request, and ensuring that the server computer does not perform the request more than once.

6. The method of claim 5,
wherein said error during the client-side code using the connection from the client computer to the server computer to send the request to the server computer comprises terminating the network connection from the client computer to the server computer before the response to the request is received from the server computer;
wherein providing error recovery for the request comprises:
the client-side code informing the client-side scheduler that the request failed;
the client-side scheduler marking the request entry corresponding to the request with a status indicating that the request needs error recovery, in response to being informed by the client-side code that the request failed;
re-establishing a connection from the client computer to the server computer;
the client-side scheduler using the connection from the client computer to the server computer to query the server computer in order to determine whether the request was successfully completed;
the client-side scheduler informing the client-side code that the request was successfully completed if the client-side scheduler determines from the query to the server computer that the request was successfully completed;
the client-side scheduler marking the request entry corresponding to the request with a status indicating that the request should be re-sent if the client-side scheduler determines from the query to the server computer that the request was not successfully completed.

7. The method of claim 6,
wherein the request sent by the client-side code to the server computer includes a job ID for the request;
wherein, in response to successfully performing the request, the server computer is operable to log the job ID for the request;
wherein said client-side scheduler querying the server computer in order to determine whether the request was successfully completed comprises the client-side scheduler querying the server computer in order to determine whether the server computer logged the job ID for the request.

8. The method of claim 1,
wherein the client-side code maintains a client-side cache;
wherein, in response to determining a need for a particular information, the client-side code is operable to check the client-side cache for the needed information;
wherein, if the client-side cache comprises the needed information, the client-side code is operable to retrieve the needed information from the client-side cache;
wherein, if the client-side cache does not comprise the needed information, the client-side code is operable to register a request entry with the client-side scheduler, wherein the request entry represents a request to retrieve the needed information from the server computer.

9. The method of claim 8,
wherein the client-side cache is implemented using a database.

10. The method of claim 8,
wherein the server-side code maintains a server-side database;
wherein the client-side code is operable to register a synchronization entry with the client-side scheduler;
wherein the synchronization entry represents a synchronization request to be sent by the client-side code to the server computer;
wherein the client-side scheduler stores the synchronization entry until a connection from the client computer to the server computer is established;
wherein the client-side scheduler notifies the client-side code that the connection from the client computer to the server computer is established;
wherein the client-side code is operable to send the synchronization request to the server computer and use the synchronization request results returned by the server computer to synchronize at least a portion of the client-side cache with the server-side database.

11. The method of claim 10,
wherein said synchronization request sent to the server computer comprises a list of item IDS and modification times.

12. The method of claim 10,
wherein said client-side code registering a synchronization entry with the client-side scheduler comprises the client-side code informing the client-side scheduler of a synchronization callback routine to associate with the synchronization entry;
wherein the client-side scheduler stores information identifying the synchronization call routine;
wherein the client-side scheduler invokes the synchronization callback routine when a connection from the client computer to the server computer is established for use by the synchronization callback routine.

13. The method of claim 12,
wherein said client-side code registering a synchronization entry with the client-side scheduler further comprises the client-side code informing the client-side scheduler of a time to invoke the synchronization callback routine;
wherein the client-side scheduler stores information identifying the time to invoke the synchronization callback routine;
wherein the client-side scheduler invokes the synchronization callback routine when the specified invocation time occurs and a connection from the client computer to the server computer is established for use by the synchronization callback routine.

14. The method of claim 13,
wherein, upon completing the synchronization of at least a portion of the client-side cache with the server-side database, the synchronization callback routine informs the scheduler of a time to re-invoke the synchronization callback routine;
wherein the scheduler stores information identifying the time to re-invoke the synchronization callback routine;
wherein the scheduler re-invokes the synchronization callback routine when the specified re-invocation time occurs and a connection from the client computer to the server computer is established for use by the synchronization callback routine.

15. The method of claim 14,
wherein the re-invocation time specified by the synchronization callback routine is calculated based on the amount of synchronization that the synchronization callback routine performed.

16. The method of claim 10,
wherein a request entry and a synchronization entry are simultaneously registered with the client-side scheduler;

wherein the client-side scheduler prioritizes the request entry over the synchronization entry with regard to notifying the client-side code that a connection from the client computer to the server computer is established.

17. The method of claim 1,
wherein the method comprises error recovery means in the event of abnormal termination of the client-side code;
wherein said error recovery means comprise ensuring that upon restart of the client-side code, any requests requiring exactly-once semantics that were in progress when the abnormal termination of the client-side code occurred are not performed multiple times.

18. The method of claim 1,
wherein the server side of the client/server application comprises a first server computer;
wherein requests sent by the client-side code are received by the first server computer and passed to a second server computer;
wherein the second server computer carries out the request.

19. The method of claim 1,
wherein the client-side scheduler is an independent software component.

20. The method of claim 19,
wherein the client-side scheduler component is a component constructed according to a software component specification from the group consisting of: COM, CORBA, JavaBeans.

21. The method of claim 1,
wherein the client-side scheduler is not an independent software component, but rather is tightly integrated with the client-side code.

22. The method of claim 1,
wherein the client-side scheduler executes on the client computer.

23. The method of claim 1,
wherein the client-side scheduler executes on a computer connected to the client computer via a local area network (LAN).

24. The method of claim 1, wherein the client/server application is an Internet application; wherein the network is the Internet.

25. The method of claim 24,
wherein the Internet application is a healthcare application.

26. The method of claim 25,
wherein the healthcare application enables healthcare workers to file health insurance claims while the client computer is disconnected from the Internet.

27. The method of claim 24,
wherein the request sent by the client-side code references a resource accessible over the Internet via a uniform resource locator (URL).

28. The method of claim 27,
wherein the client-side code interfaces with the Web browser code base in order to send the request over the Internet.

29. The method of claim 27,
wherein the client-side code uses the Web browser control as an embedded component.

30. A system for enabling a client/server application, the system comprising:
a server computer, wherein the server computer runs server-side code associated with the application;
a client computer connected to the server computer via a network, wherein the client computer runs client-side code associated with the application; and
a client-side scheduler, wherein the client-side code is operable to interface with the scheduler in order to manage requests to the server computer;
wherein the client-side code is executable to register a request entry with the clint-side scheduler while the client computer is unable to establish a connection to the server computer over the network, wherein the request entry represents a request that the client-side code needs to send to the server computer;
wherein the client-side scheduler is executable to store the request entry until a connection from the client computer to the server computer can be established for use by the client-side code;
wherein the client-side scheduler is executable to detect when a connection from the client computer to the server computer is established;
wherein the client-side scheduler is executable to notify the client-side code that the connection from the client computer to the server computer over the network is established;
wherein the client-side code is executable to use the connection to the server computer to send the request to the server;
wherein said client-side code registering a request entry with the client-side scheduler comprises the client-side code storing request context information for the request entry; and
wherein said client-side code using the established connection the client computer to the server computer to send the request to the server computer comprises the client-side code retrieving the request context information to formulate the appropriate request to send to the server computer.

31. The system of claim 30,
wherein said client-side code registering a request entry with the client-side scheduler comprises the client-side code informing the client-side scheduler of a callback routine to associate with the request entry;
wherein said client-side scheduler storing the request entry comprises the client-side scheduler storing information identifying the callback routine;
wherein said client-side scheduler notifying the client-side code that the connection from the client computer to the server computer is established comprises the client-side scheduler invoking the callback routine.

32. The system of claim 30, wherein said client-side code storing request cintex information for the request entry comprises the client-side code storing the request context information in a database.

33. The system of claim 32,
wherein said client-side code registering a request entry with the scheduler comprises the client-side code informing the scheduler of a database key identifier for the request context information stored in the database;
wherein said scheduler storing the request entry comprises the scheduler storing the database key identifier;
wherein said scheduler notifying the client-side code that the connection from the client computer to the server computer is established comprises the scheduler passing the database key identifier to the client-side code;
wherein said client-side code retrieving the request context information for the request entry comprises the client-side code using the database key identifier to retrieve the request context information from the database.

34. The system of claim 30,
wherein the that the client-side code needs to send to the server computer requires exactly-once semantics;
wherein said client-side code registering a request entry with the client-side scheduler comprises the client-side code informing the client-side scheduler that the request requires exactly-once semantics;
wherein said client-side scheduler storing the request entry comprises the client-side scheduler storing information specifying that the request requires exactly-once semantics;
wherein, in the case of an error during said client-side code using the established connection from the client computer to the server computer to send the request to the server computer, the method includes means for providing error recovery for the request, wherein said means for providing error recovery ensure that the server computer does not perform the request more than once.

35. The system of claim 34,
wherein said error during the client-side code using the established connection from the client computer to the server computer to send the request to the server computer comprises the network connection between the client computer and the server computer being terminated before the response to the request is received from the server computer;
wherein said means for providing error recovery for the request comprise:
the client-side code informing the client-side scheduler that the request failed;
the client-side scheduler marking the request entry corresponding to the request with a status indicating that the request needs error recovery, in response to being informed by the client-side code that the request failed;
a connection from the client computer to the server computer being re-established;
the client-side scheduler using the re-established connection from the client computer to the server computer to query the server computer in order to determine whether the request was successfully completed;
the client-side scheduler informing the client-side code that the request was successfully completed if the client-side scheduler determines from the query to the server computer that the request was successfully completed;
the client-side scheduler marking the request entry corresponding to the request with a status indicating that the request should be re-sent if the client-side scheduler determines from the query to the server computer that the request was not successfully completed.

36. The system of claim 35,
wherein the request sent by the client-side code to the server computer includes a job ID for the request;
wherein, in response to successfully performing the request, the server computer is operable to log the job ID for the request;
wherein said client-side scheduler querying the server computer in order to determine whether the request was successfully completed comprises the client-side scheduler querying the server computer in order to determine whether the server computer logged the job ID for the request.

37. The system of claim 30,
wherein the client-side code maintains a client-side cache;
wherein, in response to determining a need for a particular information, the client-side code is operable to check the client-side cache for the needed information;
wherein, if the client-side cache comprises the needed information, the client-side code is operable to retrieve the needed information from the client-side cache;
wherein, if the client-side cache does not comprise the needed information, the client-side code is operable to register a request entry with the client-side scheduler, wherein the request entry represents a request to retrieve the needed information from the server computer.

38. The system of claim 37,
wherein the client-side cache is implemented using a database.

39. The system of claim 37, further comprising a server-side database;
wherein the server-side code maintains a server-side database;
wherein the client-side code is operable to register a synchronization entry with the client-side scheduler;
wherein the synchronization entry represents a synchronization request to be sent by the client-side code to the server computer;
wherein the client-side scheduler stores the synchronization entry until a connection from the client computer to the server computer can be established for use by the client-side code;
wherein the client-side scheduler notifies the client-side code that the connection from the client computer to the server computer is established;
wherein the client-side code is operable to send the synchronization request to the server computer using the established connection and use the synchronization request results returned by the server computer to synchronize at least a portion of the client-side cache with the server-side database.

40. The system of claim 39,
wherein said synchronization request sent to the server computer comprises a list of item IDS and modification times;
wherein, in response to receiving the synchronization request, the server computer is operable to return a list of new items to add to the client-side cache, a list of items to delete form the client-side cache, and a list of items to update in the client-side cache.

41. The system of claim 39,
wherein said client-side code registering a synchronization entry with the client-side scheduler comprises the client-side code informing the client-side scheduler of a synchronization callback routine to associate with the synchronization entry;
wherein the client-side scheduler stores information identifying the synchronization call routine;
wherein the client-side scheduler invokes the synchronization callback routine when a connection from the client computer to the server computer is established for use by the synchronization callback routine.

42. The system of claim 41,
wherein said client-side code registering a synchronization entry with the client-side scheduler further comprises the client-side code informing the client-side scheduler of a time to invoke the synchronization callback routine;

wherein the client-side scheduler stores information identifying the time to invoke the synchronization callback routine;

wherein the client-side scheduler invokes the synchronization callback routine when the specified invocation time occurs and a connection from the client computer to the server computer is established for use by the synchronization callback routine.

43. The system of claim 42, wherein, upon completing the synchronization of at least a portion of the client-side cache with the server-side database, the synchronization callback routine informs the client-side scheduler of a time to re-invoke the synchronization callback routine;

wherein the client-side scheduler stores information identifying the time to re-invoke the synchronization callback routine;

wherein the client-side scheduler re-invokes the synchronization callback routine when the specified re-invocation time occurs and a connection from the client computer to the server computer is established for use by the synchronization callback routine.

44. The system of claim 43, wherein the re-invocation time specified by the synchronization callback routine is calculated based on the amount of synchronization that the synchronization callback routine performed.

45. The system of claim 39, wherein a request entry and a synchronization entry are simultaneously registered with the client-side scheduler;

wherein the client-side scheduler prioritizes the request entry over the synchronization entry with regard to notifying the client-side code that a connection from the client computer to the server computer is established.

46. The system of claim 30, wherein the method comprises error recovery means in the event of abnormal termination of the client-side code;

wherein said error recovery means comprise ensuring that upon restart of the client-side code, any requests requiring exactly-once semantics that were in progress when the abnormal termination of the client-side code occurred are not performed multiple times.

47. The system of claim 30, wherein the server side of the client/server application comprises a first server computer;

wherein requests sent by the client-side code are received by the first server computer and passed to a second server computer;

wherein the second server computer carries out the request.

48. The system of claim 30, wherein the client-side scheduler is an independent software component.

49. The system of claim 48, wherein the client-side scheduler component is a component constructed according to a software component specification from the group consisting of: COM, CORBA, JavaBeans.

50. The system of claim 30, wherein the client-side scheduler is not an independent software component, but rather is tightly integrated with the client-side code.

51. The system of claim 30, wherein the client-side scheduler executes on the client computer.

52. The system of claim 30, wherein the client-side scheduler executes on a computer connected to the client computer via a local area network (LAN).

53. The system of claim 30, wherein the client/server application is an Internet application; wherein the network is the Internet.

54. The system of claim 53, wherein in Internet application is a healthcare application.

55. The system of claim 54, wherein the healthcare application enables healthcare workers to file health insurance claims while the client computer is disconnected from the Internet.

* * * * *